US011944589B1

(12) United States Patent
Garcia

(10) Patent No.: US 11,944,589 B1
(45) Date of Patent: Apr. 2, 2024

(54) NASOGASTRIC TUBE SECURING DEVICE

(71) Applicant: Carmen V. Garcia, Severn, MD (US)

(72) Inventor: Carmen V. Garcia, Severn, MD (US)

( * ) Notice: Subject to any disclaimer, the term of this patent is extended or adjusted under 35 U.S.C. 154(b) by 384 days.

(21) Appl. No.: 17/482,574

(22) Filed: Sep. 23, 2021

(51) Int. Cl.
*A61J 15/00* (2006.01)

(52) U.S. Cl.
CPC ....... *A61J 15/0061* (2013.01); *A61J 15/0003* (2013.01)

(58) Field of Classification Search
CPC .......................... A61J 15/0061; A61J 15/0003
USPC .......................................................... 604/174
See application file for complete search history.

(56) References Cited

U.S. PATENT DOCUMENTS 3,568,678 A 3/1971 Pourquier et al.
4,742,824 A 5/1988 Payton et al.
4,986,815 A 1/1991 Schneider
5,448,985 A * 9/1995 Byrd .................... A61M 25/02 128/DIG. 26
5,833,663 A 11/1998 Bierman et al.
D422,699 S 4/2000 Weatherholt
8,291,906 B2 * 10/2012 Kooij ................ A61M 16/0616 128/207.11
8,905,031 B2 * 12/2014 Barlow .............. A61M 16/0611 128/206.25
9,180,270 B2 * 11/2015 Kapust ............. A61M 16/0096
9,504,630 B2 11/2016 Liu
10,722,672 B2 7/2020 Lim
2002/0066452 A1 * 6/2002 Kessler ................. A61M 25/02 128/207.18
2002/0157673 A1 10/2002 Kessler et al.
2008/0190436 A1 8/2008 Jaffe et al.

* cited by examiner

*Primary Examiner* — Phillip A Gray
(74) *Attorney, Agent, or Firm* — Cramer Patent & Design PLLC; Aaron R. Cramer

(57) ABSTRACT

A nasogastric tube securing device is an apparatus designed to hold various medical tubes that enter through a person's nose without the use of adhesive tape. A first configuration of the device will attach to an upper lip area of a patient allowing the tube to enter upward into the nasal cavity. A second configuration will attach to the distal end of a nose with a downward facing clip that also holds the tube as it enters the nasal cavity. In both configurations, the clip system used utilizes a plastic sliding track that holds the tube and allows it to slide back and forth, either across the upper lip or side to side along the user patient's nose. The tube clip on the track permits one tube to be exchanged for another one without removing the adhesive, thus eliminating repeating trauma to the skin area. Both clip systems are held in place with Allevyn® Adhesive, Mepilex® silicone foam dressing, or similar product to further reduce skin irritation.

20 Claims, 3 Drawing Sheets

NASOGASTRIC TUBE SECURING DEVICE

RELATED APPLICATIONS

Non-applicable.

FIELD OF THE INVENTION

The present invention relates generally to a tube securing device and more specifically to a nasogastric tube securing device.

BACKGROUND OF THE INVENTION

During a hospital visit our other long-term extended stay in a medical facility, patients must often endure having various tubes inserted into their nasal cavity. Such tubes include nasogastric tubes for use in feeding and administering drugs as well as oxygen tubes used to deliver concentrated oxygen. Such tubes are typically held in place to the user's nose and upper lip area using sections of adhesive tape. Each time the various tubes are removed and/or replaced; new pieces of tape are utilized.

As one could imagine, such tape quickly becomes irritating leading to it chaffing, redness, and other discomfort for the patient. Accordingly, there exists a need for a means by which patients who have various medical tubes inserted into their nasal cavity can be spared the discomfort of adhesive tape. The development of the nasogastric tube securing device fulfills this need.

SUMMARY OF THE INVENTION

To achieve the above and other objectives, the present invention provides for a nasogastric tube securing device that has, a nasal strip adapted to attach to the outside of a nose of a patient, a pair of left adjustment tracks having a pair of parallel tracks located on a first side of the nasal strip, a pair of right adjustment tracks having a pair of parallel tracks located on a second side of the nasal strip, and a tube clamp retaining a nasogastric tube in position as the nasogastric tube passes through a naris. The tube clamp slidably couples to the nasal strip via the pair of left adjustment tracks or the pair of right adjustment tracks. The tube clamp includes an upper plug, a lower plug, and a clip. The nasal strip includes a left tab and a right tab. The nasal strip includes an adhesive layer located on the proximal side of the nasal strip. The nasal strip is adapted to cover a nasal dorsum and a plurality of sides of the nose. The pair of left adjustment tracks include an upper track and a lower track. The upper track and the lower track are oriented to lie parallel to each other to maintain a separation distance that is constant. The pair of right adjustment tracks include an upper track and a lower track. The upper track and the lower track are oriented to lie parallel to each other to maintain a separation distance that is constant.

The left tab and the right tab may protrude downward under a front of the nose to protect a plurality of nares from the tube clamp. The adhesive layer may be adapted to retain the nasal strip to the skin of the nose. The adhesive layer may be protected by a backing prior to use. The backing may be peeled off of the nasal strip to reveal the adhesive layer before applying the nasal strip. The nasal strip may be made of a medical grade foam. The medical grade foam may be made of Mepilex® or Allevyn®. The nasal strip may remain attached to the skin for up to seven days. A center of the nasal strip may include a writable surface adapted for a medical practitioner to annotate. The medical practitioner may write on the nasal strip to record a date and time that the nasogastric tube was placed and a set of initials of the medical practitioner placing the nasogastric tube. The pair of left adjustment tracks may be adapted to retain the tube clamp and to guide movements of the tube clamp when the nasogastric tube is placed through a left naris. The pair of right adjustment may be adapted to retain the tube clamp and to guide a plurality of movements of the tube clamp when the nasogastric tube is placed through a right naris. One of the individual pair of adjustment tracks may be coupled to the side of the nasal strip and be oriented to run from an edge of the nasal strip adjacent an ala towards a center of the nose, ending before reaching a nasal dorsum. The tube clamp may be adapted to be laterally repositioned to avoid pressure injuries to a mucosa without necessitating removal and reapplication of the nasal strip. The tube clamp may slidably couple to the individual pair of adjustment tracks such that the tube clamp is moved towards the nasal dorsum or away from the nasal dorsum. The individual tracks selected from the upper track and the lower track may include a channel such that one of the plugs of the tube clamp engages the channel and slides along the channel. The tube clamp may include a set screw located on a top side of the tube clamp above the upper plug, above the lower plug, or both. The set screw may be turned in an opposite direction to unlock the tube clamp such that the tube clamp is free to slide along one of the individual pair of adjustment tracks. The tube clamp may be made from a semi-rigid hypoallergenic material. The tube clamp may be made from a medical grade silicone.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
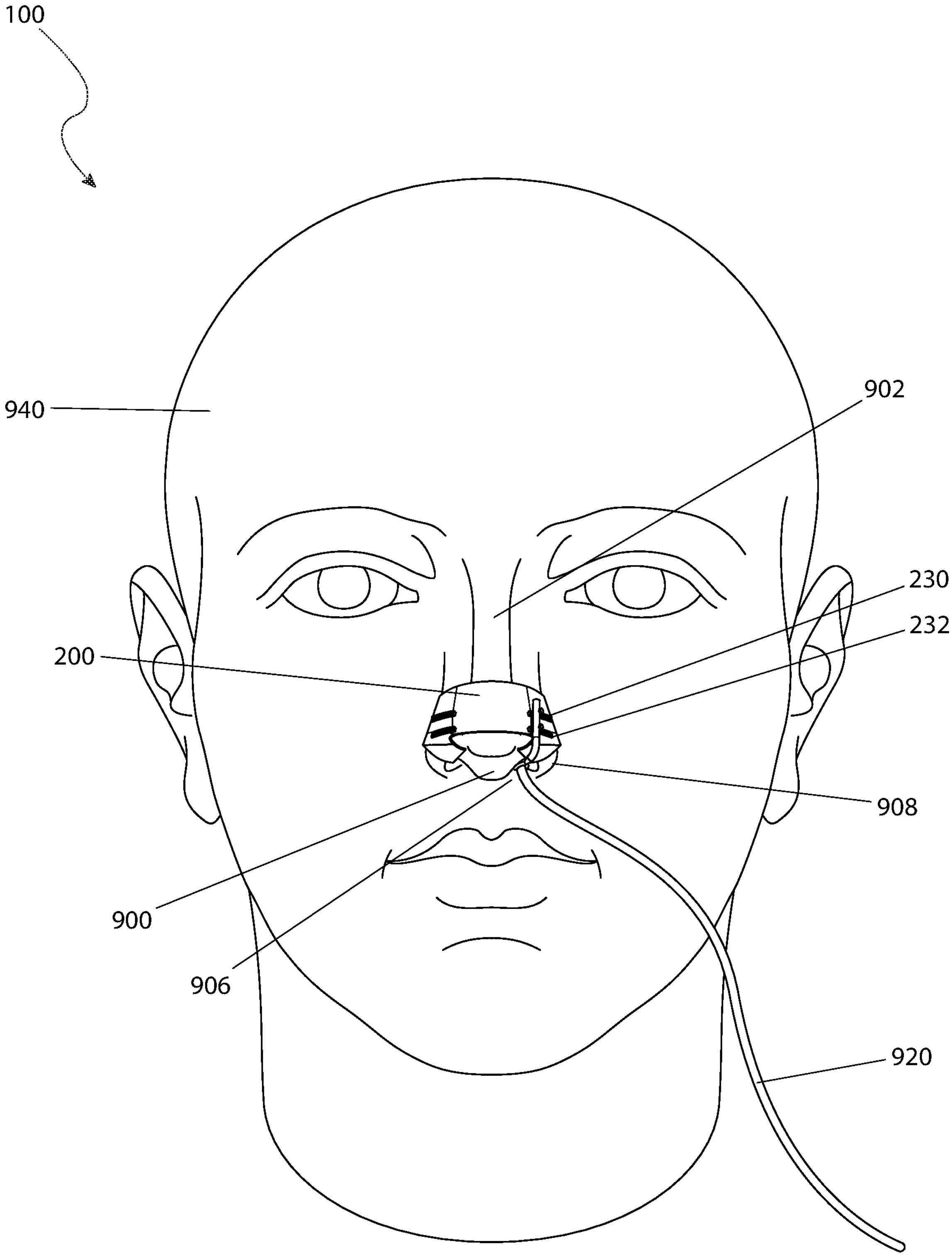
FIG. 1 is an in-use view of a nasogastric tube securing device, according to an embodiment of the present invention.
Figure 2:
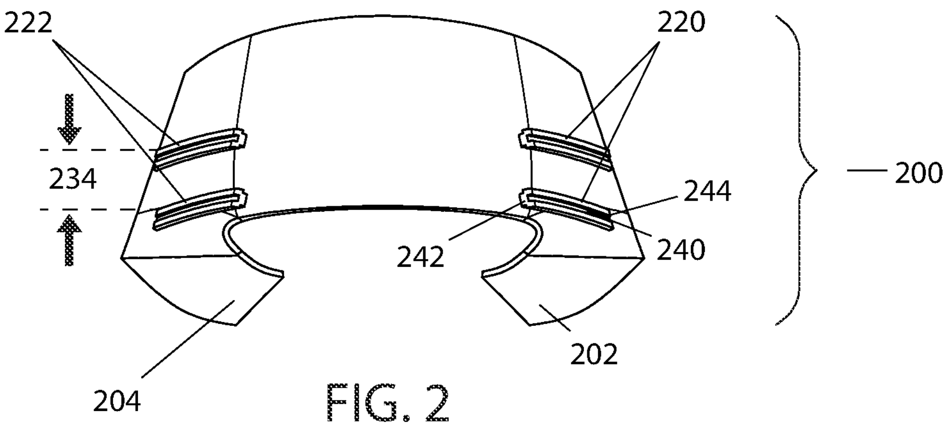
FIG. 2 is a front view of a nasal strip, according to an embodiment of the present invention.
Figure 3:
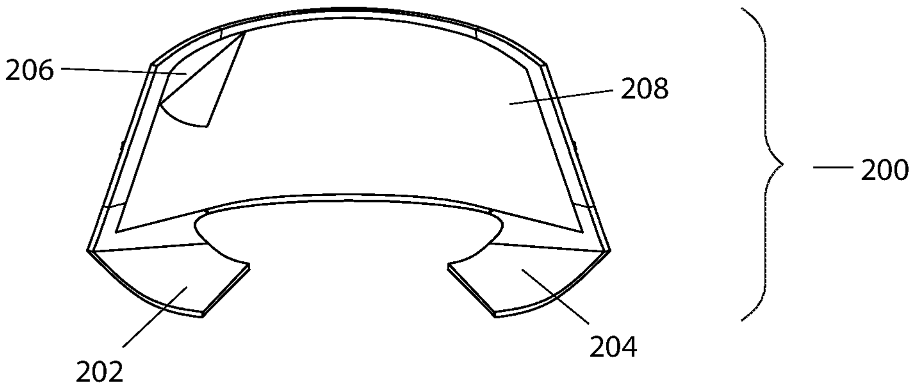
FIG. 3 is a rear view of a nasal strip, according to an embodiment of the present invention.
Figure 4:
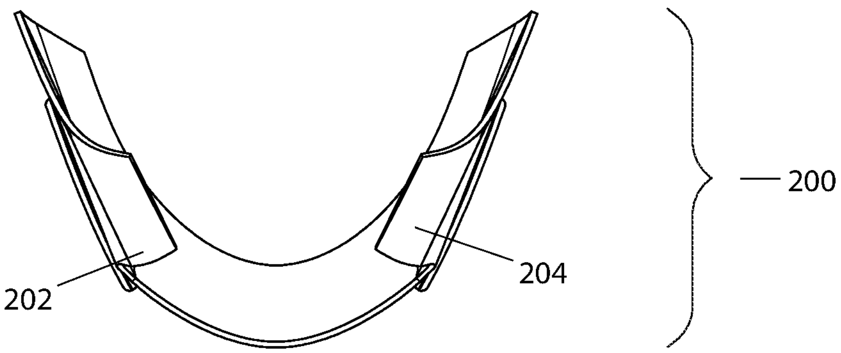
FIG. 4 is a bottom view of a nasal strip, according to an embodiment of the present invention.
Figure 5:
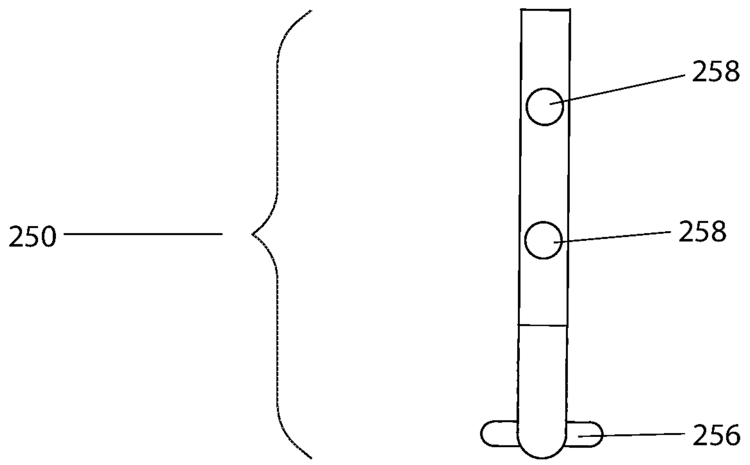
FIG. 5 is a top view of a tube clamp, according to an embodiment of the present invention.
Figure 6:
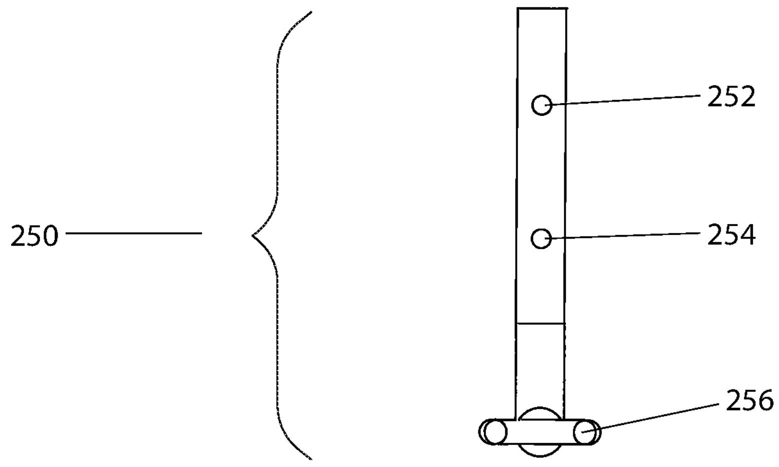
FIG. 6 is a bottom view of a tube clamp, according to an embodiment of the present invention.

100 nasogastric tube securing device
200 nasal strip
202 left tab
204 right tab
206 adhesive layer
208 backing
220 pair of left adjustment tracks
222 pair of right adjustment tracks
230 upper track
232 lower track
234 separation distance
240 channel
242 closed top end

244 open bottom end
250 tube clamp
252 upper plug
254 lower plug
256 clip
258 set screw
900 nose
902 nasal dorsum
906 naris
908 ala
920 nasogastric tube
940 patient

DESCRIPTION OF THE INVENTION

The present invention is directed to a nasogastric tube securing device (herein described as the "invention") 100. The invention 100 may comprise a nasal strip 200, a pair of left adjustment tracks 220, a pair of right adjustment tracks 222, and a tube clamp 250. The nasal strip 200 may be adapted to attach to the outside of the nose 900 of a patient 940 undergoing nasogastric intubation without contacting the columella of the nose 900. The tube clamp 250 may retain a nasogastric tube 920 in position as the nasogastric tube 920 passes through a naris 906. The tube clamp 250 may slidably couple to the nasal strip 200 via the pair of left adjustment tracks 220 or the pair of right adjustment tracks 222. The tube clamp 250 may be adapted to be laterally repositioned to avoid pressure injuries to the mucosa without necessitating removal and reapplication of the nasal strip 200. Use of the invention 100 may result in less frequent removal of the nasal strip 200, longer life for an adhesive layer 206 holding the nasal strip 200 to the nose 900, and less frequent removal and reinsertion of the nasogastric tube 920.

Note that throughout this document, the directional terms "left" and "right" use the reference frame of the patient 940 who is wearing the invention 100. "Left" refers to the patient's left or movement towards the patient's left and "right" refers to the patient's right or movement towards the patient's right.

The nasal strip 200 may be adapted to adhesively couple to the outside surface of the nose 900. The nasal strip 200 may be adapted to cover a nasal dorsum 902 and the sides of the nose 900. The nasal strip 200 may comprise a left tab 202 and a right tab 204. The left tab 202 and the right tab 204 may protrude downward under the front of the nose 900 to protect the nares 906 from the tube clamp 250.

The nasal strip 200 may comprise the adhesive layer 206 located on the proximal side of the nasal strip 200. The adhesive layer 206 may be adapted to retain the nasal strip 200 to the skin of the nose 900. The adhesive layer 206 may be protected by a backing 208 prior to use. The backing 208 may be peeled off of the nasal strip 200 to reveal the adhesive layer 206 before applying the nasal strip 200.

The nasal strip 200 may be made of a medical grade foam. As non-limiting example, the nasal strip 200 may be made of an adhesive foam, such as Mepilex® or Allevyn®. In some embodiments, the nasal strip 200 may remain attached to the skin for up to seven days (7 d).

The center of the nasal strip 200 may comprise a writable surface adapted for a medical practitioner to annotate. As a non-limiting example, the medical practitioner may write on the nasal strip 200 using a permanent marker to record the date and time that the nasogastric tube 920 was placed, the initials of the medical practitioner placing the nasogastric tube 920, or combinations thereof.

The pair of left adjustment tracks 220 may be a pair of parallel tracks located on the left side of the nasal strip 200. The pair of left adjustment tracks 220 may be adapted to retain the tube clamp 250 and to guide movements of the tube clamp 250 when the nasogastric tube 920 is placed through the left naris. The pair of right adjustment tracks 222 may be a pair of parallel tracks located on the right side of the nasal strip 200. The pair of right adjustment tracks 222 may be adapted to retain the tube clamp 250 and to guide movements of the tube clamp 250 when the nasogastric tube 920 is placed through the right naris.

An individual pair of adjustment tracks selected from the pair of left adjustment tracks 220 and the pair of right adjustment tracks 222 may comprise an upper track 230 and a lower track 232. The upper track 230 and the lower track 232 may be oriented to lie parallel to each other to maintain a separation distance 234 that is constant. The individual pair of adjustment tracks may be coupled to the side of the nasal strip 200 and may be oriented to run from the edge of the nasal strip 200 adjacent an ala 908 towards the center of the nose 900, ending before reaching the nasal dorsum 902. The tube clamp 250 may slidably couple to the individual pair of adjustment tracks such that the tube clamp 250 may be moved towards the nasal dorsum 902 or away from the nasal dorsum 902. The nasogastric tube 920 may be adapted to be repositioned to avoid continued pressure on a single location of the naris 906 by moving the tube clamp 250 along the individual pair of adjustment tracks.

An individual track selected from the upper track 230 and the lower track 232 may comprise a channel 240 such that a plug of the tube clamp 250 may engage the channel 240 and may slide along the channel 240. As a non-limiting example, the channel 240 may have the cross-section of a C-channel with a lip and the plug may be held by the lip as the plug is guided along the channel 240. The individual track may comprise a closed top end 242 and an open bottom end 244. The closed top end 242 may prevent the plug on the tube clamp 250 from sliding out of the channel 240 when the plug reaches the end of the individual track closest to the nasal dorsum 902. The open bottom end 244 may permit the plug to separate from the individual track when the plug reaches the end of the individual track farthest from the nasal dorsum 902.

The tube clamp 250 may retain the nasogastric tube 920 at a constant position relative to the nasal strip 200 unless moved to a different position using deliberate force. The tube clamp 250 may comprise an upper plug 252, a lower plug 254, and a clip 256. The distance between the upper plug 252 and the lower plug 254 may match the separation distance 234 of the individual pair of adjustment tracks. The upper plug 252 and the lower plug 254 may slidably couple to the upper track 230 and the lower track 232 on the nasal strip 200, respectively. The tube clamp 250 may be moved by pushing on one (1) side of the tube clamp 250 or the other such that the upper plug 252 and the lower plug 254 slide along the upper track 230 and the lower track 232.

The clip 256 may be a fastener that is operable to hold the nasogastric tube 920. As a non-limiting example, the clip 256 may be a "U"-shaped end of the tube clamp 250 that may grasp the nasogastric tube 920. In some embodiments, the clip 256 may flex in order to hold more than one (1) size of the nasogastric tube 920. As a non-limiting example, the clip 256 may be operable to hold tubing of 14 Fr, 16 Fr, or 18 Fr (according to the French catheter scale).

The tube clamp 250 may be made from a semi-rigid hypoallergenic material. As a non-limiting example, the tube clamp 250 may be made from a medical grade silicone.

In some embodiments, the tube clamp 250 may comprise a set screw 258. The set screw 258 may be located on the top side of the tube clamp 250 above the upper plug 252, above the lower plug 254, or both. The set screw 258 may be adapted to be turned by hand in order to lock the tube clamp 250 into a fixed position such that the tube clamp 250 will not slide along the individual pair of adjustment tracks. The set screw 258 may be turned in the opposite direction to unlock the tube clamp 250 such that the tube clamp 250 may be free to slide along the individual pair of adjustment tracks.

In use, the medical practitioner may clean the nose 900 of the patient 940 with plain water and then dry the nose 900. Cleaning and drying the nose 900 may help the nasal strip 200 adhere to the skin. The tube clamp 250 may be coupled to the nasal strip 200 using the pair of left adjustment tracks 220 or the pair of right adjustment tracks 222, based upon which of the nares 906 the medical practitioner intends to place the nasogastric tube 920 into. The backing 208 may be removed from the nasal strip 200 to expose the adhesive layer 206. The nasogastric tube 920 may be inserted into the naris 906 according to standard nursing practice and facility policy. Once the nasogastric tube 920 is inserted, the medical practitioner may hold the nasogastric tube 920 with the non-dominant hand and then place the nasal strip 200 onto the nose 900 using the dominant hand. The nasal strip 200 may be smoothed to remove wrinkles by gently pressing on the nasal strip 200. Lastly, the nasogastric tube 920 may be snapped into the clip 256 on the tube clamp 250 and the set screw 258 may be tightened to prevent movement.

To reposition the nasogastric tube 920 by a few millimeters, the medical practitioner may loosen the set screw 258, slide the tube clamp 250, and re-tighten the set screw 258.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A nasogastric tube securing device, comprising:

a nasal strip adapted to attach to the outside of a nose of a patient, the nasal strip includes a left tab and a right tab, the nasal strip includes an adhesive layer located on the proximal side of the nasal strip, the nasal strip is adapted to cover a nasal dorsum and a plurality of sides of the nose;

a pair of left adjustment tracks having a pair of parallel tracks located on a first side of the nasal strip, the pair of left adjustment tracks include an upper track and a lower track, the upper track and the lower track are oriented to lie parallel to each other to maintain a separation distance that is constant;

a pair of right adjustment tracks having a pair of parallel tracks located on a second side of the nasal strip, the pair of right adjustment tracks include an upper track and a lower track, the upper track and the lower track are oriented to lie parallel to each other to maintain a separation distance that is constant; and a tube clamp retaining a nasogastric tube in position as the nasogastric tube passes through a naris, the tube clamp slidably couples to the nasal strip via the pair of left adjustment tracks or the pair of right adjustment tracks, the tube clamp includes an upper plug, a lower plug, and a clip.

2. The nasogastric tube securing device, according to claim 1, wherein the left tab and the right tab protrude downward under a front of the nose to protect a plurality of nares from the tube clamp.

3. The nasogastric tube securing device, according to claim 1, wherein the adhesive layer is adapted to retain the nasal strip to the skin of the nose.

4. The nasogastric tube securing device, according to claim 1, wherein the adhesive layer is protected by a backing prior to use.

5. The nasogastric tube securing device, according to claim 4, wherein the backing is peeled off of the nasal strip to reveal the adhesive layer before applying the nasal strip.

6. The nasogastric tube securing device, according to claim 1, wherein the nasal strip is made of a medical grade foam.

7. The nasogastric tube securing device, according to claim 6, wherein the medical grade foam is made of Mepilex® or Allevyn®.

8. The nasogastric tube securing device, according to claim 1, wherein the nasal strip remains attached to the skin for up to seven days.

9. The nasogastric tube securing device, according to claim 1, wherein a center of the nasal strip includes a writable surface adapted for a medical practitioner to annotate.

10. The nasogastric tube securing device, according to claim 9, wherein the medical practitioner writes on the nasal strip to record a date and time that the nasogastric tube was placed and a set of initials of the medical practitioner placing the nasogastric tube.

11. The nasogastric tube securing device, according to claim 1, wherein the pair of left adjustment tracks are adapted to retain the tube clamp and to guide movements of the tube clamp when the nasogastric tube is placed through a left naris.

12. The nasogastric tube securing device, according to claim 1, wherein the pair of right adjustment are adapted to retain the tube clamp and to guide a plurality of movements of the tube clamp when the nasogastric tube is placed through a right naris.

13. The nasogastric tube securing device, according to claim 1, wherein one of the individual pair of adjustment tracks are coupled to the side of the nasal strip and are oriented to run from an edge of the nasal strip adjacent an ala towards a center of the nose, ending before reaching a nasal dorsum.

14. The nasogastric tube securing device, according to claim 1, wherein the tube clamp is adapted to be laterally repositioned to avoid pressure injuries to a mucosa without necessitating removal and reapplication of the nasal strip.

15. The nasogastric tube securing device, according to claim 1, wherein the tube clamp slidably couples to the individual pair of adjustment tracks such that the tube clamp is moved towards the nasal dorsum or away from the nasal dorsum.

16. The nasogastric tube securing device, according to claim 1, wherein one of the individual tracks selected from the upper track and the lower track include a channel such that one of the plugs of the tube clamp engages the channel and slides along the channel.

17. The nasogastric tube securing device, according to claim 1, wherein the tube clamp includes a set screw located on a top side of the tube clamp above the upper plug, above the lower plug, or both.

18. The nasogastric tube securing device, according to claim 17, wherein the set screw is turned in an opposite direction to unlock the tube clamp such that the tube clamp is free to slide along one of the individual pair of adjustment tracks.

19. The nasogastric tube securing device, according to claim 1, wherein the tube clamp is made from a semi-rigid hypoallergenic material.

20. The nasogastric tube securing device, according to claim 19, wherein the tube clamp is made from a medical grade silicone.

* * * * *